United States Patent [19]
Ganfield et al.

[11] Patent Number: 5,815,694
[45] Date of Patent: Sep. 29, 1998

[54] APPARATUS AND METHOD TO CHANGE A PROCESSOR CLOCK FREQUENCY

[75] Inventors: Paul Allen Ganfield; Charles Luther Johnson; James David Strom, all of Rochester, Minn.

[73] Assignee: International Business Machines Corporation, Armonk, N.Y.

[21] Appl. No.: 576,172

[22] Filed: Dec. 21, 1995

[51] Int. Cl.⁶ .................................................. G06F 1/08
[52] U.S. Cl. .................. 395/556; 327/113; 331/177 R
[58] Field of Search ................................ 395/556, 750, 395/750.01, 750.03, 750.04; 327/113–120, 291, 295; 331/1 R, 18, 25, 177 R

[56] References Cited

U.S. PATENT DOCUMENTS

| | | |
|---|---|---|
| 4,520,394 | 5/1985 | Kaneko . |
| 4,870,684 | 9/1989 | Arai et al. . |
| 5,021,679 | 6/1991 | Fairbanks et al. .................. 307/66 |
| 5,113,152 | 5/1992 | Norimatus .......................... 331/11 |
| 5,142,247 | 8/1992 | Lada, Jr. et al. .................. 331/25 X |
| 5,237,697 | 8/1993 | Nakano ............................ 395/750 |
| 5,278,814 | 1/1994 | Deguchi et al. . |
| 5,355,502 | 10/1994 | Schowe et al. ................... 395/750 |
| 5,420,545 | 5/1995 | Davis et al. ........................ 331/17 |

*Primary Examiner*—Thomas M. Heckler
*Attorney, Agent, or Firm*—Merchant, Gould, Smith, Edell, Welter & Schmidt

[57] ABSTRACT

An apparatus and method for providing a variable frequency clock source is described wherein the frequency may be changed while maintaining the phase of the clock signal. A frequency conversation circuit, such as a phase locked loop (PLL), is employed to change the frequency of the clock and is controlled by a control unit which maintains the phase of the output clock signal while undergoing a frequency change operation.

17 Claims, 6 Drawing Sheets

APPARATUS AND METHOD TO CHANGE A PROCESSOR CLOCK FREQUENCY

BACKGROUND OF THE INVENTION

1. Field of the Invention

This present invention relates to a clock circuit and, more particularly, to changing the frequency in a clock circuit.

2. Description of Related Art

Recently, it has become increasingly desirable to reduce the power consumption of processors. The speed of a processor is determined, in part, by the frequency of its clock. The amount of current drawn in a processor is also proportional to the clock frequency. With processor speeds of hundreds of megahertz, power consumption by a processor increases significantly. Moreover, as low power operating environments become more prevalent, for example, by the increased use of portable computing devices, decreasing power consumption has become much more important. One method suggested to reduce power consumption is to place a processor in a "sleep mode" by shutting off the clock when no activity is needed for a period of time. This approach is satisfactory when state information associated with the processor can be maintained without driving the clock. When a periodic refresh is required to maintain state information, the processor may be placed in a "slow mode" where the clock is slowed down as much as possible while maintaining a clock rate sufficient to perform needed operations. A problem is encountered, however, when changing the processor clock frequency potentially causes a transient change in the power supply voltage. If this change is large enough, the state of the processor could be destroyed. Thus, when a clock frequency is changed it must be changed slowly to avert adverse consequences, even when changing to a sleep mode.

A typical processor may operate using a clock grid structure with large input buffers having a significant delay, thereby buffering the input clock signal. A Phase Locked Loop (PLL) may be used to receive an input oscillation frequency and produce a clock signal at a selected frequency. The PLL is used to drive the buffer at an integer or non-integer multiple of the input frequency and to keep the clock grid in phase with the input clock signal. In such a clock structure, the clock grid frequency cannot be changed by simply dividing the output of the PLL. Therefore, there exists a need for a mechanism to change the output frequency of the PLL in such a structure.

One suggested method to accomplish a frequency change in such a structure is to incorporate a dummy delay in the feedback path of the PLL, allowing a simple divider to be placed at the front of the clock buffer to change the frequency. However, in such a system there will be error caused by a difference in phase between the clock grid and the buffer input because the dummy delay will not exactly match the real delay. Alternatively, it has been suggested to add the divider after the clock buffer. However, this would require multiple copies of the divider, perhaps thousands, one at each load point in order to reduce the voltage surge.

SUMMARY OF THE INVENTION

To overcome the limitations in the prior art described above, and to overcome other limitations that will become apparent upon reading and understanding the present specification, there is generally provided a mechanism for changing the frequency of a clock provided to a processing unit without disrupting phase of the clock.

A system in accordance with one embodiment includes an apparatus for changing the frequency of a clock signal provided to a processing unit. The apparatus includes a constant frequency clock source and a frequency conversion circuit coupled between the constant frequency clock source and the processing unit. The frequency conversion circuit produces an output clock signal having a frequency which is a multiple of the constant frequency clock source. The output clock signal is provided to the processing unit. The apparatus also includes a control unit, coupled to the frequency conversion circuit, to control the change in frequency of the output clock signal such that the phase of the clock signal provided to the processing unit remains substantially constant.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of exemplary embodiments, reference is made to the accompanying drawings which form a part hereof, and in which is shown by way of illustration various embodiments in which the invention may be practiced. It is to be understood that other embodiments may be utilized, as structural changes may be made without departing from the scope of the present invention.

Figure 1:
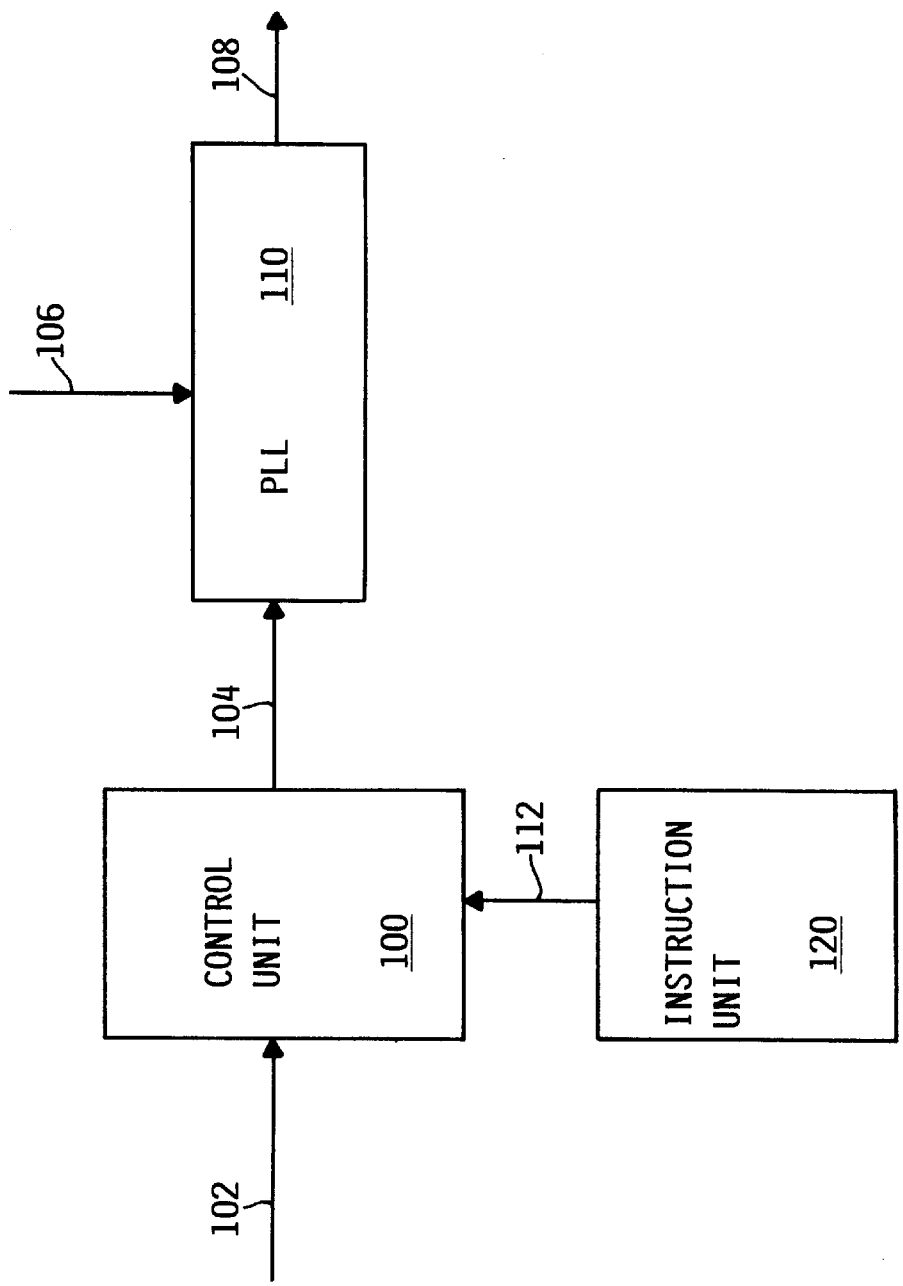
FIG. 1 is a block diagram showing an embodiment of the invention.

FIG. 1 illustrates an exemplary system according to the present invention. An instruction unit 120 specifies an instruction to initiate a low power mode. The instruction unit 120 provides a signal 112 to a control unit 100, to configure the control unit 100 for low power operation. The control unit 100 controls the operation of a PLL circuit 110. The PLL circuit 110 is coupled to an input clock source 106 having a constant frequency. In response to the control signals 104 from the control unit 100, the PLL circuit 110 multiplies or divides the constant frequency by a prescribed amount to produce an output clock signal 108, at a desired output frequency. The control unit 100 controls the PLL 110 such that the phase of the output clock signal does not change during a change in frequency. Providing input to control unit 100 is control signal 102.

Figure 2:
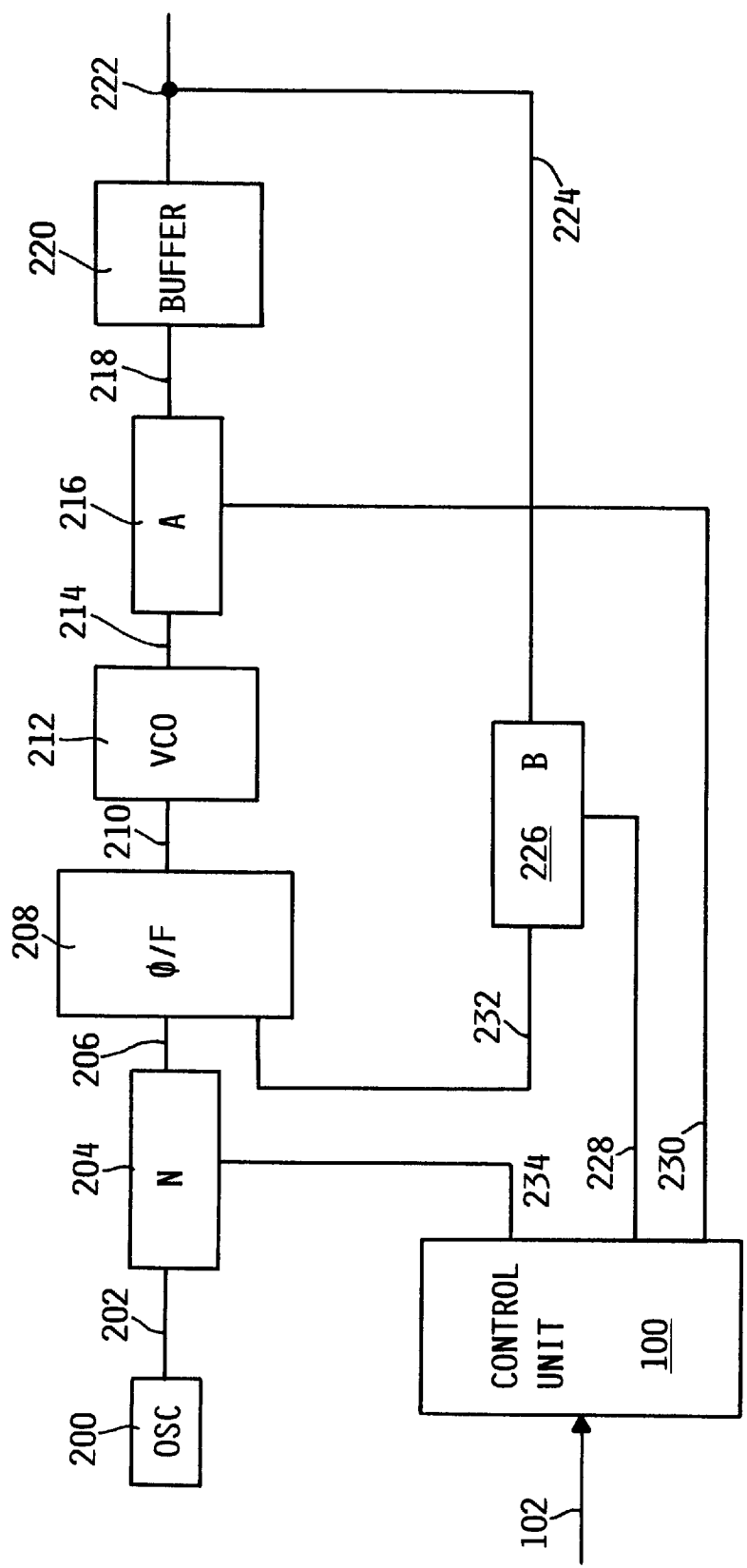
FIG. 2 is a block diagram of the PLL circuit according to an embodiment of invention.

Referring to FIG. 2, an exemplary PLL circuit 110 used to change a clock frequency will be described. Any analog PLL design may be used. A clock signal 202, generated by an oscillator 200 and operated at an oscillating frequency OSC, is provided to a divide-by-N frequency divider 204. The oscillating frequency is divided by N to produce a signal having a new frequency of OSC/N which is provided as a first input to a phase/frequency detector 208. A second input signal 232 to the phase/frequency detector 208 is provided as feedback from the output of the PLL as described more fully below. The phase/frequency detector 208 generates a control signal 210, which is a function of the sum and difference of the frequency of the first and second input signals, to a Voltage Controlled Oscillator (VCO) 212. The output 214 of a VCO 212 is provided to a divide-by-A frequency divider 216. The divided frequency signal 218 is provided to a buffer 220 which has its output coupled to a clock grid 222. The buffered clock grid signal 224 is provided to a divide-by-B frequency divider 226. The output from the divide-by-B frequency divider 226 is provided as the second input signal 232 to the phase/frequency detector 208. The ratio between the clock grid 222 frequency and the input oscillator 200 frequency is B/N. If this ratio is always an integer, for both normal and low power speeds, the divide-by-N frequency divider 204 can be omitted. The divide-by-A frequency divider 216 allows normal processor speeds below the VCO 212 operating range. A control unit 100 provides control signals 234, 228, and 230 to the divide-by-N divider 204, the divide-by-B divider 226, and the divide-by-A divider 216, respectively.

In order to change the processor clock frequency without altering the phase of the PLL, i.e., without losing lock on the PLL, the change in frequency should be transparent to the general operation of the PLL. Unless the divide-by-N frequency divider 204 changes, both inputs 206 and 232 to the phase/frequency detector 208 remain at a constant phase and frequency, and thus the output of the VCO 212 is constant. If the divide-by-N frequency divider 204 is changed, the phase/frequency detector 208 will have a frequency change in its input 206. In accordance with an aspect of the invention, the frequency change will occur on both inputs 206 and 232 at the same time. Thus, the phase will be maintained.

When changing from one frequency to another, the phase seen by the phase/frequency detector 208 may be maintained constant by satisfying the relationship:

$$A*B/N=k,$$

where k is a constant.

To satisfy the above relationship, either A and B must both be changed to maintain a constant product, or A and N must be changed by the same factor. Changing both B and N while keeping A*B/N constant would result in the same output frequency. Some example divider values are shown in the following tables, with the resulting frequency multiplication factor for each combination:

TABLE I

| A | B | N | Mult |
|---|---|---|------|
| 2 | 4 | 1 | 4.0 |
| 4 | 2 | 1 | 2.0 |
| 8 | 1 | 1 | 1.0 |
| 16 | 1 | 2 | 0.5 |

TABLE II

| A | B | N | Mult |
|---|---|---|------|
| 2 | 3 | 1 | 3.0 |
| 3 | 2 | 1 | 2.0 |
| 6 | 1 | 1 | 1.0 |
| 12 | 1 | 2 | 0.5 |

TABLE III

| A | B | N | Mult |
|---|---|---|------|
| 2 | 3 | 2 | 1.5 |
| 3 | 2 | 2 | 1.0 |
| 6 | 1 | 2 | 0.5 |
| 12 | 1 | 4 | 0.25 |

As shown in TABLE I, with the value of A for the divide-by-A divider 216 set at 2 and the value for the divide-by-B divider 226 set at 4, the clock frequency 222 would operate at a frequency four times the input oscillator 200 frequency. If the values of the dividers change, for example changing the value of A from 2 to 4 and the value of B from 4 to 2, the clock frequency 222 is reduced to twice that of the input oscillator 200 frequency. After two more series of changes in divider values are taken, as illustrated in TABLE I, a final clock frequency of one-half the input oscillator 200 frequency is obtained. This frequency is ⅛ the original frequency of the clock and may correspond, for example, to a sleep mode.

Although theoretically the values of A, B, and N could reduce the clock frequency to ⅛ of the initial frequency in a single change, in many environments incremental changes in the values of A, B, and N may be needed to reduce the effects of any transient power surge. Likewise, to return the processor clock to full speed, a similar series of changes in the values of the dividers could be followed. The values of the above tables are for illustrative purposes only. Other values of A, B, and N may be used depending on the processor requirements.

As described above, when changing frequencies it is important to maintain the phase of the input signals to the phase/frequency detector 208. In the circuit depicted in FIG. 2, consideration must be given to the function and delay of the various dividers to properly control frequency switching operations.

Figure 3A:
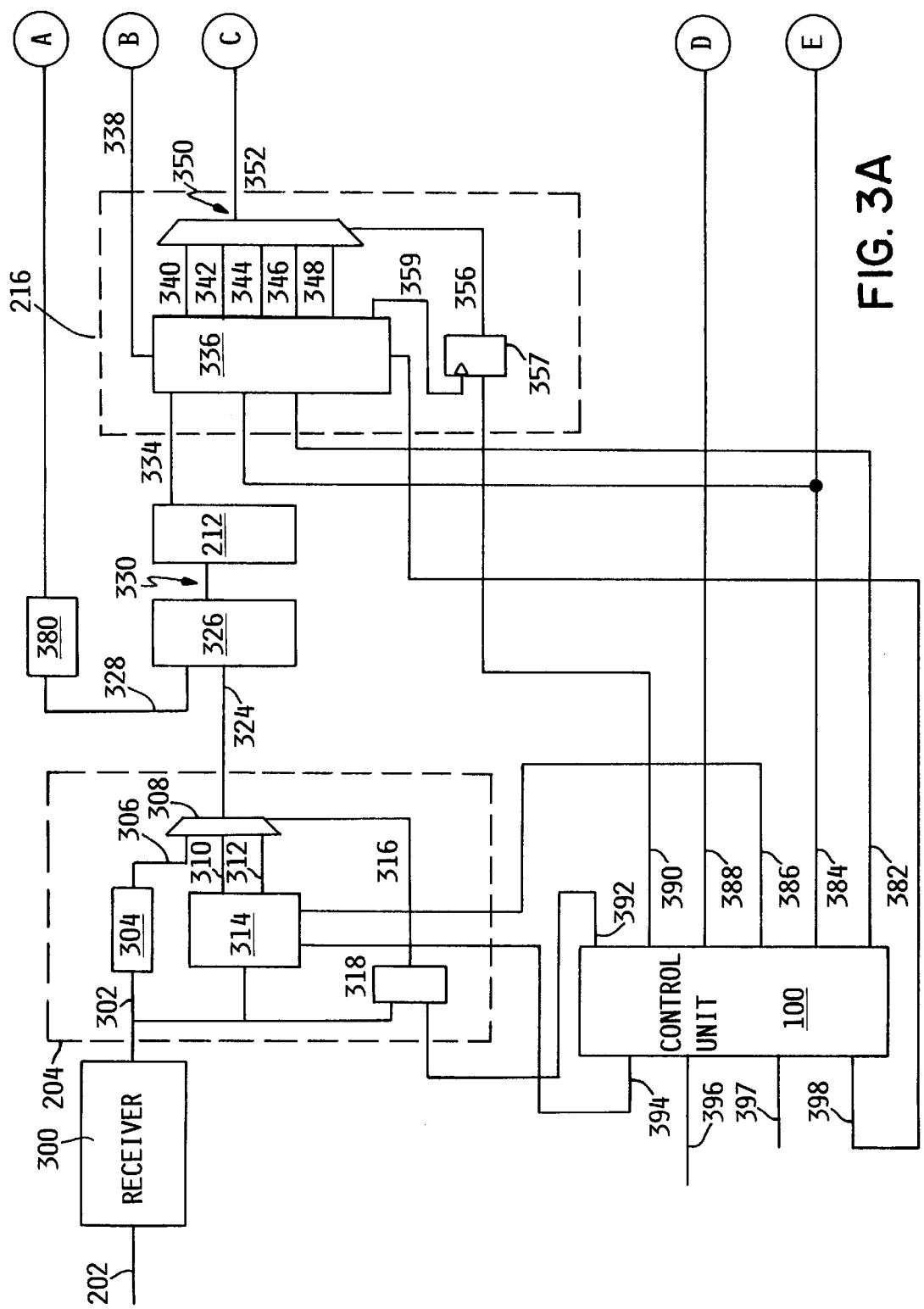
FIGS. 3a and 3b are block diagrams illustrating a control unit and PLL in accordance with an embodiment of the invention.
Figure 3B:
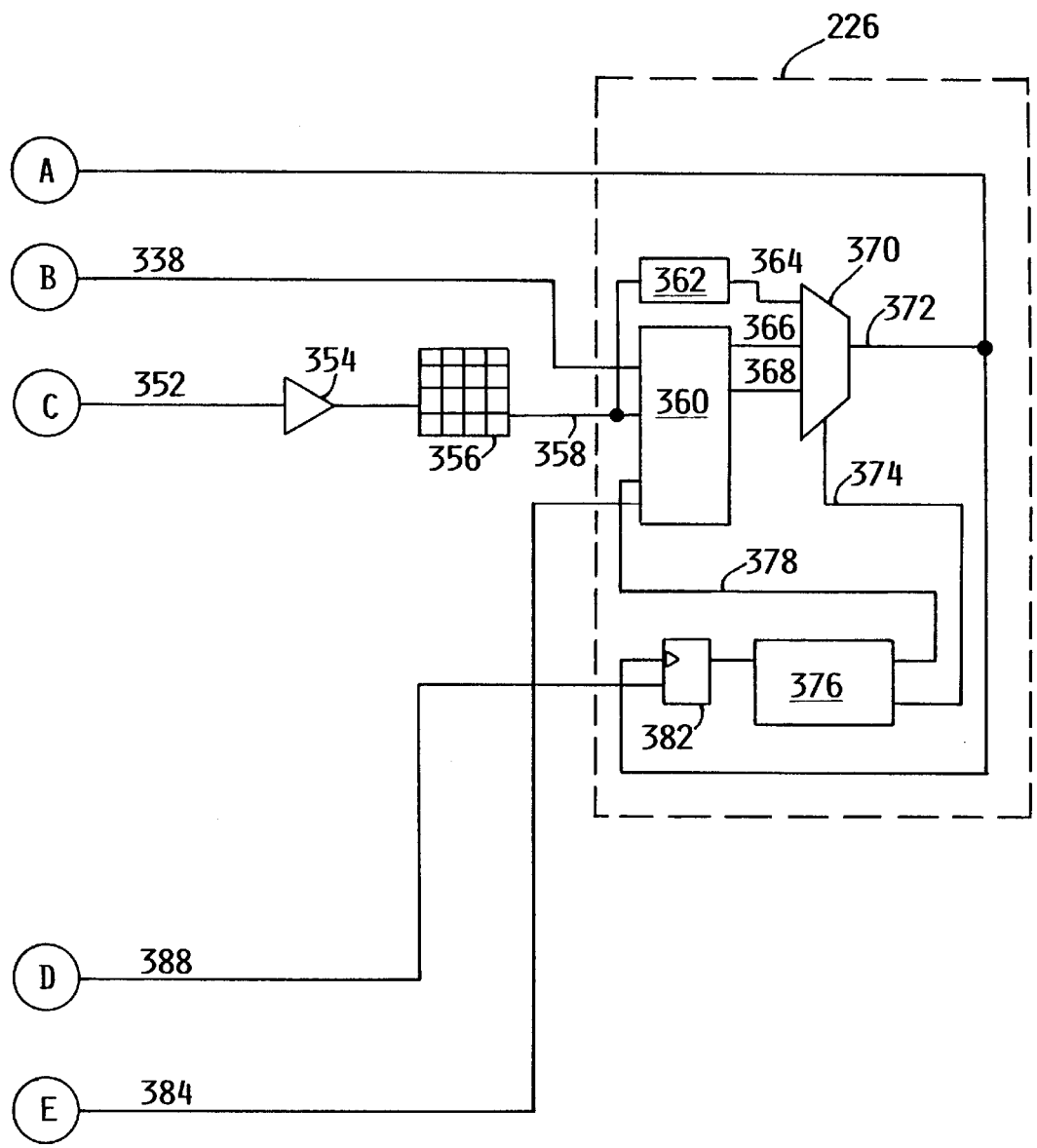

FIGS. 3a and 3b illustrate an exemplary PLL control system which maintains phase conditions of the input signals to the phase/frequency detector 208. An oscillator input 202 is provided to a receiver 300. The receiver 300 provides a signal 302 to a two-bit N counter 314 in a divide-by-N circuit 204. A delay 304 is provided which matches the delay of the two-bit N counter to provide an equivalent delay to the counter when a divide-by-one control signal is received. In other words, if the divide-by-N circuit 204 divides by one, the two-bit N counter 314 is skipped and a delay 304 equivalent to the delay of the two-bit N counter 314 is used. The receiver signal 302 is also used to clock a latch 318 which gates a three-line MUX select signal 392 provided from a control unit 100. A decoded three-line MUX select signal 316 is provided to a first multiplexer 308 as a control signal to select the appropriate output for the division factor. For example, the decoded three-line MUX select signal 316 selects the divide-by-two output 310 of the two-bit N counter 314 to reduce the frequency of the oscillator input 202 by one-half. Of course, other divider designs may be used.

An output signal from the first multiplexer 308 is provided as a first input signal 324 to a phase/frequency comparator 326. An output 330 from the phase/frequency comparator 326 is provided to control a VCO 212. A VCO output signal 334 is provided to a five-bit A counter 336 in a divide-by-A circuit 216. A reference signal 359 from the five-bit A counter 336 clocks a latch 357 which gates a five-line MUX select signal 390 from the control unit 100. A decoded five-line MUX select signal 356 is provided to a second multiplexer 350 connected to the five-bit A counter 336 in order to select the appropriate division factor. A second multiplexer output signal 352 is provided to a clock buffer 354 and then to a clock grid 356. For the feedback loop of the PLL, a clock grid signal 358 is provided to a two-bit B counter 360 in a divide-by-B circuit 226.

The divide-by-B circuit 226 functions similarly to the divide-by-N circuit 204. If a divide-by-one operation is selected, the two-bit B counter 360 is skipped and a delay 362 equivalent to the delay of the two-bit B counter 360 is provided to a third multiplexer 370. An output signal 372 from the divide-by-B circuit 226 is also used to clock a latch 382 which gates an encoded two-line MUX select signal 388 from the control unit 100. The latch 382 provides a signal to a decode circuit 376. The decode circuit 376 provides a decoded three-line MUX select 374 to a third multiplexer 370 as a control signal in order to select the appropriate division factor. The decode circuit 376 also provides a two-line select 378 to the two-bit B counter 360. The output signal 372 of the divide-by-B circuit is provided by the third multiplexer 370. The output signal 372 is provided to a delay 380. The delay provides a second input signal 328 to the phase/frequency comparator 326 to complete the feedback loop.

The timing of the frequency changes in the various dividers is important. The control unit 100 sends and receives signals from the divider circuits such that the inputs to the phase/frequency comparator 326 maintain substantially identical frequency and phase. A synchronization mechanism is provided in the divider circuits to ensure proper timing. Since the divide-by-A divider 216 operates before the other two dividers, it provides the synchronization signals. A sync signal 398 from the five-bit A counter 336 is provided to the control unit 100. The control unit 100 provides a sync signal 386 to the two-bit N counter 314 to reset the two-bit N counter so that it is in sync with the five-bit A counter 336. The control unit 100 is provided with a sync signal 394 from the two-bit N counter 314. For the divide-by-B divider 226, the divide-by-A divider 216 will generate a B reset signal 338 at the fastest rate of the B (and N) output, which will cause the two-bit B counter 360 to reset to a specific value, e.g., all 1's or all 0's, on its next clock. The B reset signal 338 can be free-running since, after the initial reset, subsequent pulses will occur when the counter would naturally go to the reset value. For the divide-by-N divider 204, an N reset signal 386 is generated at the slowest rate of N output. The N reset signal 386 cannot be free-running, since the reset should not occur while the PLL is locking.

If the PLL will always lock at the slowest output frequency, these reset signals will not be needed. In this case, the dividers will always be correct for frequency switching when the PLL is locked.

Other inputs to the control unit 100 from the instruction unit 120 include preliminary configuration input signals 396 and power mode input signals 397 indicating the parameters of the power mode, including the normal full speed operation of the PLL, the counter values, whether a slow or sleep mode should be implemented, and at what frequency. The control unit 100 provides a two-line reference select signal 382 to the five-bit A counter 336 which contains constants based on the configuration input signals 396 and the power mode input signals 397. The control unit 100 provides a divide-by-three mode signal 384 to the five-bit A counter 336 and the two-bit B counter 360. Depending on the processor requirements, the divide-by-three mode signal 384 is used to select a different set of counter values. Full speed could be three times the input oscillator 202 frequency when divide-by-three mode is on. When the divide-by-three mode is off, the five-bit A counter 336 and the two-bit B counter 360 would be selecting from powers of two, such as 2× and 4×. The processor clock 356 could operate at one, two, three, or four times the speed of the input oscillator 202, depending on the functional requirements of the processor.

Figure 4:
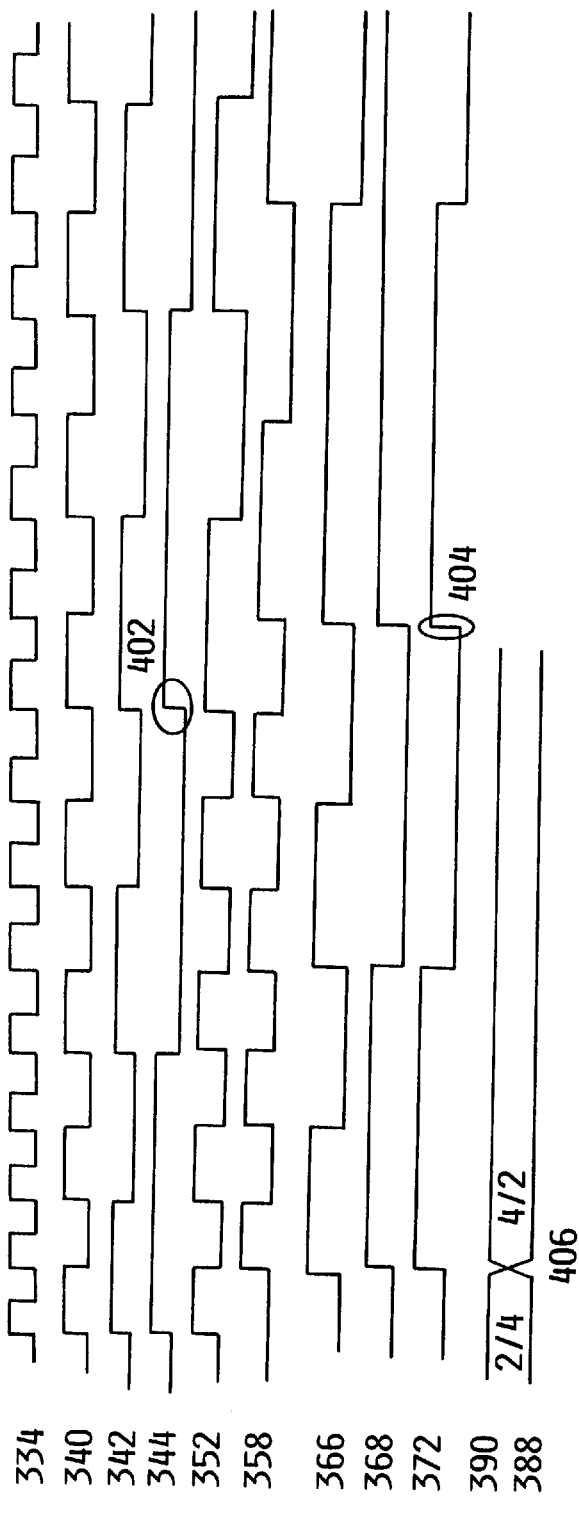
FIG. 4 is a timing chart illustrating an operation of divider control logic in accordance with an embodiment of the invention.

FIG. 4 illustrates the timing of the operation of the divide-by-A divider 216 and the divide-by-B divider 226 as the values A and B are switched from 2 to 4 and 4 to 2, respectively. The first line is the VCO output signal 334. The next three lines, 340, 342, and 344, are the bits in the five-bit A counter 336. The VCO signal 334 is driving the counter. The illustrated example presents an operation of changing the A counter 336 from 2 to 4 and the B counter 360 from 4 to 2. The second multiplexer output signal 352 represents the output of the second multiplexer 350 initially selecting a frequency at VCO/2. At a switch point 402, a new frequency VCO/4 is selected. The clock grid signal 358 is delayed from the second multiplexer output signal 352 by 2½ nanoseconds to represent a delay of the clock buffer 354. The clock grid signal 358 is the actual clock frequency that the processor is using. Lines 366 and 368 represent outputs from the B counter 360. A third multiplexer output signal 372 is the output of the third multiplexer 370 which chooses between the B counter bits. At a switch point 404, the third multiplexer output signal 372 changes from a frequency clock grid/4 to clock grid/2. Because the clock grid signal 358 changes from OSC*4 to OSC*2, the frequency of the third multiplexer output signal 372 remains constant. The third multiplexer signal output 372 also represents the oscillator input 202 when the value of the N divider is one. The output of the B divider 226 and the input oscillator 202, through the receiver 300, are the two inputs of the phase/frequency comparator 326, which remain in phase and are of the same frequency. At switch point 406, the five-line MUX select signal 390 and two-line MUX select signal 388 are switching from 2 to 4 and from 4 to 2.

Figure 5:
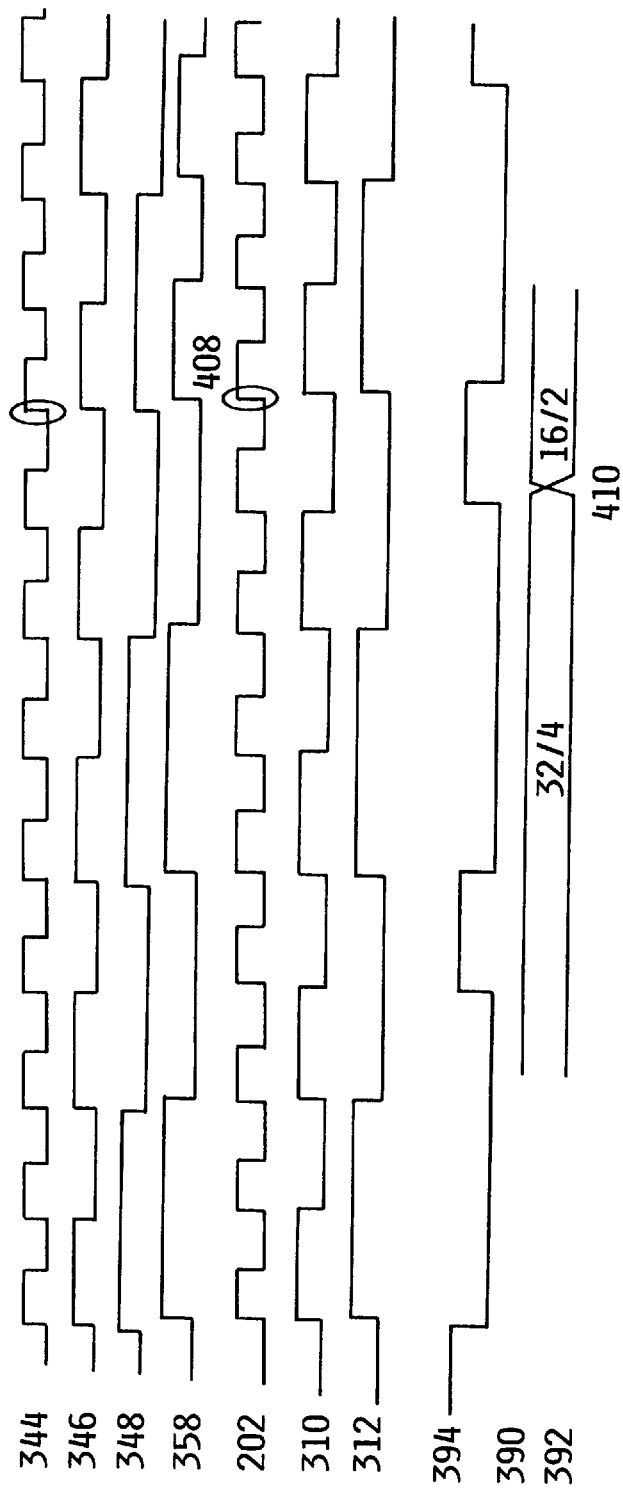
FIG. 5 is a timing diagram illustrating an operation of divider control logic in accordance with another embodiment of the invention.

FIG. 5 illustrates the timing of the operation of the divide-by-A divider 216 and the divide-by-N divider 204 when they switch from 32 to 16 and 4 to 2, respectively. The first line 344 represents the divide-by-eight output of the five-bit A counter 336. The next two lines, 346 and 348, are the divide-by-sixteen and the divide-by-thirty-two outputs of the five-bit A counter 336. The fourth line represents the clock grid signal 358, which is the same as the third multiplexer output signal 372 because the value of the divide-by-B divider is equal to one. At switch point 408, the clock grid signal 358 indicates a change in the first multiplexer 308 from 4 to 2 and in the second multiplexer 350 from 32 to 16. The next line is the input oscillator signal 202. The next two lines, 310 and 312, illustrate the input signals to the multiplexer 308. The sync signal 394 is generated when all of the bits in divide-by-N divider are 0, causing new values of the multiplexer control signals 390 and 392 to be selected immediately proceeding the switch point 410. The sync signal 394 is provided to change the MUX controls in the divide-by-N circuit 204 and the divide-by-A circuit 216. It is noted that when changing the divide-by-B circuit 226, the sync signal is not needed because the control logic for the divide-by-B circuit is running off of the clock grid. At switch point 410 the five-line MUX select signal 390 and the three-line MUX select signal 392 are switching from 32 to 16 and 4 to 2.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for changing frequency of a clock signal provided to a processing unit, the apparatus comprising:
    an input frequency clock source outputting an input frequency clock signal;
    a frequency conversion circuit, coupled between the input frequency clock source and the processing unit, to produce an output clock signal having a frequency which is a multiple of the input frequency clock signal, as the clock signal provided to the processing unit wherein the frequency conversion circuit comprises:
        a first divider circuit, coupled to receive the input frequency clock signal and to a control unit to receive a first division control signal, the first divider circuit dividing the input frequency clock signal by a first division factor N to produce a first divided signal in response to the first division control signal;
        a phase/frequency comparator, coupled to receive the first divided signal as a first input;
        a voltage controlled oscillator (VCO) coupled to receive a VCO control signal from the phase/frequency comparator, the VCO producing an output signal having a VCO frequency;
        a second divider circuit, coupled to receive the output signal from the VCO and to the control unit to receive a second division control signal, the second divider circuit dividing the VCO frequency of the output signal by a second division factor A to produce a second divided signal as the clock signal provided to the processing unit in response to the second division control signal; and
        a third divider circuit, coupled to receive the second divided signal and to the control unit to receive a third division control signal, the third divider dividing the second divided signal by a third division factor B to produce a third divided signal in response to the third division control signal, the third divider circuit being further coupled to the phase/frequency comparator to provide the third divided signal as a second input to the phase/frequency comparator, the phase/frequency comparator comparing frequency and phase of the first input and the second input to produce the VCO control signal; and
    said control unit, coupled to the frequency conversion circuit, the control unit controlling a change in the frequency of the output clock signal such that a phase of the clock signal provided to the processing unit remains substantially constant.

2. An apparatus as recited in claim 1, wherein the first division factor N, the second division factor A and the third division factor B are selected according to the relationship $$A*B/N=k,$$

where k is a constant.

3. An apparatus as recited in claim 1, further comprising a buffer coupled between an output of the second divider circuit and the processing unit.

4. An apparatus as recited in claim 1, wherein the control unit is coupled to receive a mode selection signal, the control unit controlling a change in the frequency of the output clock signal in response to the mode selection signal.

5. An apparatus as recited in claim 4, wherein the mode selection signal initiates a slow mode by reducing the frequency of the output clock signal.

6. An apparatus as recited in claim 1, wherein the first divider circuit comprises
    a first counter coupled to receive the input frequency clock signal to produce a plurality of output signals as multiples of the input frequency clock;
    a first latch, coupled to the control unit to receive the first division control signal, indicative of one of the plurality of output signals of the counter, the first latch providing a first multiplexer select signal to select the one of the plurality of output signals of the first counter in synchronization with the input frequency clock signal; and
    a multiplexer, coupled to the first counter, to select the one of the plurality of output signals of the first counter in response to a first multiplexer select signal.

7. An apparatus as recited in claim 6, wherein the second divider circuit comprises
    a second counter coupled to receive the output signal from the VCO to produce a plurality of output signals as multiples of the VCO frequency;
    a second latch, coupled to the control unit to receive the second division control signal, indicative of one of the plurality of output signals of the counter, the second latch providing a second multiplexer select signal to select the one of the plurality of output signals of the second counter in synchronization with a reference signal from the second counter; and
    a multiplexer, coupled to the second counter, to select the one of the plurality of output signals of the second counter in response to a second multiplexer select signal.

8. An apparatus as recited in claim 7, wherein the third divider circuit comprises
    a third counter coupled to receive the clock signal provided to the processing unit to produce a plurality of output signals as multiples of the clock signal provided to the processing unit;
    a third latch, coupled to the control unit to receive the third division control signal, indicative of one of the plurality of output signals of the counter, the third latch providing a third multiplexer select signal to select the one of the plurality of output signals of the third counter in synchronization with the clock signal provided to the processing unit; and
    a multiplexer, coupled to the third counter, to select the one of the plurality of output signals of the third counter in response to a third multiplexer select signal.

9. An apparatus as recited in claim 8, further comprising a means coupled to the second counter for providing a synchronization signal to synchronize operation of the first counter and the third counter to the second counter.

10. A system comprising:
    a processing unit;
    an input frequency clock source;
    a frequency conversion circuit, coupled between the input frequency clock source and the processing unit, to produce a processor clock signal having a frequency which is a multiple of the input frequency clock source wherein the frequency conversion circuit comprises:

a phase/frequency comparator coupled to the input frequency clock source to receive a first input having a first frequency;

a voltage controlled oscillator (VCO) coupled to receive a VCO control signal from the phase/frequency comparator, the VCO producing an output signal having a VCO frequency;

a first divider, coupled to receive the output signal from the VCO, the first divider dividing the output signal from the VCO by a first division factor A to produce the clock signal provided to the processing unit; and a second divider, coupled to receive the clock signal provided to the processing unit to divide the clock signal by a second division factor B and to provide the divided clock signal to the phase/frequency comparator as a second input to the phase/frequency comparator, the phase/frequency comparator comparing frequency and phase of the first input and the second input to produce the VCO control signal; and a control unit, coupled to the frequency conversion circuit, the control unit controlling a change in the frequency of the processor clock signal output from the frequency conversion circuit such that a phase of the processor clock signal provided to the processing unit remains substantially constant.

11. A method of changing an output clock frequency, comprising the steps of:

a) generating a first signal having a first frequency;

b) dividing the first signal by a ratio N to produce a first control signal;

c) using the control signal as a first input to control an output frequency of a voltage controlled oscillator (VCO);

d) dividing an output of the VCO by a ratio A to produce the output clock frequency;

e) dividing the output clock frequency by a ratio B to produce a second control signal;

f) using the second control signal as a second input to control the output frequency of the VCO; and g) changing the output clock frequency by changing at least two of the ratios N, A and B in a manner such that the first control signal remains in phase with the second control signal.

12. A method of claim 11, wherein step g) comprises the steps:

selecting the ratio A, the ratio N, and the ratio B according to the relationship $$A*B/N=k,$$

wherein k is a constant.

13. A method as recited in claim 11, wherein the step g) comprises the steps of:

(i) changing at least two of the ratios N, A and B to reduce the output clock frequency by a predetermined amount; and (ii) repeating step (i) a number of times until the output clock frequency is reduced to a desired reduced frequency.

14. A method of claim 11, wherein step b) comprises the steps of:

providing the first signal to a first counter;

producing a plurality of output signals as multiples of the first frequency from the first counter;

holding in a first latch a first division control signal, indicative of one of the plurality of output signals of the first counter; and selecting the one of the plurality of output signals of the first counter indicated by the first division control signal in synchronization with the first frequency.

15. A method of claim 14, wherein step d) comprises the steps of:

providing the output of the VCO to a second counter;

producing a plurality of output signals as multiples of the output of the VCO;

holding in a second latch a second division control signal, indicative of one of the plurality of output signals of the second counter; and selecting the one of the plurality of output signals of the second counter indicated by the second division control signal in synchronization with the input frequency clock signal.

16. A method of claim 15, wherein step e) comprises the steps of:

providing the output clock frequency to a third counter;

producing a plurality of output signals as multiples of the output clock frequency;

holding in a third latch a third division control signal, indicative of one of the plurality of output signals of the third counter; and selecting the one of the plurality of output signals of the third counter indicated by the third division control signal in synchronization with the input frequency clock signal.

17. A method of claim 16, further comprising the step of:

providing a synchronization signal from the second counter to synchronize the first counter and the third counter.

* * * * *

UNITED STATES PATENT AND TRADEMARK OFFICE
CERTIFICATE OF CORRECTION

PATENT NO. : 5,815,694

DATED : September 29, 1998

INVENTOR(S) : Paul Allen Ganfield et al

It is certified that error appears in the above-identified patent and that said Letters Patent is hereby corrected as shown below:

IN THE CLAIMS:

Claim 11, Column 9, Line 34: "using the control signal" should be --using the first control signal--.

Signed and Sealed this

Twenty-ninth Day of December, 1998

Attest:

BRUCE LEHMAN

Attesting Officer    Commissioner of Patents and Trademarks